Patented June 15, 1943

2,321,987

UNITED STATES PATENT OFFICE 2,321,987

MIRROR

Wilbur F. Brown, Toledo, Ohio, assignor to Libbey-Owens-Ford Glass Company, Toledo, Ohio, a corporation of Ohio No Drawing. Application August 4, 1940,
Serial No. 351,445

7 Claims. (Cl. 88—105)

The present invention relates generally to the manufacture of mirrors and more particularly to improvements in colored or tinted mirrors.

In the past, there has always been a substantial demand for gold mirrors as well as silvered mirrors. By "gold mirror" is meant one giving a gold reflection as distinguished from the customary silvered mirror which gives a clear reflection. Gold mirrors have heretofore been produced by applying a golding solution to the back of clear transparent glass. These mirrors have, however, never been as commonly used as the silvered mirrors due largely to the increased cost and difficulty of applying the golding solution to the glass. Not only is the golding solution considerably more expensive than a silvering solution but, in addition, the golding solution is harder to handle. Furthermore, the labor involved in making such a gold mirror is practically double that of making a silver mirror since, after golding, a regular silvering solution must be deposited on top of the gold for protection.

It is the aim of this invention to provide a gold mirror which can be made at a cost comparable with the ordinary silvered mirrors; which can be produced more easily, quickly and conveniently than the gold mirrors heretofore used; which is of exceptional clarity and brilliance; which possesses a high degree of reflectivity; and which is stable in use.

According to the invention, instead of employing clear transparent glass and applying a golding solution to one side thereof to give the desired golden reflection, there is provided a special transparent glass having the desired golden color and which can then be backed up with the usual silvering solution to give a gold reflection. In this way, the color of the mirror is determined by the composition of the glass itself and not by the reflecting surface material applied thereto, with the result that the color of the mirror is stable and not dependent upon the color of the reflecting surface material or its application to the glass.

In producing such a mirror, it is first necessary to provide a colored or tinted glass having the desired golden appearance and possessing the required clarity and brilliance rendering it suitable for use as a mirror. Also, the glass must be of such character that the golden reflection thereof will not be in any way adversely affected or modified by the application of the silvering solution thereto.

Generally stated, the special mirror glass herein provided comprises a soda-lime-silica glass and is produced by adding to an ordinary plate glass batch certain coloring materials which give to the glass the desired golden color without materially affecting its transmission of visible light. These coloring materials consist of commercial cerium hydrate and commercial titanium dioxide combined with one another in predetermined relative amounts and added to the base plate glass batch during the melting thereof.

The cerium hydrate and titanium dioxide may be added to an ordinary soda-lime-silica plate glass batch or to any batch of this type which makes good quality clear flat glass. It is preferred, however, that the finished glass contain approximately 10% by weight of the combined cerium oxide and titanium dioxide which is added to the base batch in the ratio of approximately 3 parts titanium dioxide to 1 part cerium hydrate. By way of example, the following base plate glass batch may be satisfactorily used, although the invention is not limited to the use of these particular ingredients or the specific glass composition resulting therefrom.

Base glass batch

| | Pounds |
|---|---|
| Sand | 1,000 |
| Limestone | 350 |
| Soda ash | 300 |
| Salt cake | 50 |
| Arsenic | 10 |

Base glass composition

| | Per cent |
|---|---|
| $SiO_2$ | 72.5 |
| $Al_2O_3 + Fe_2O_3$ | .5 |
| $CaO$ | 13.0 |
| $Na_2O$ | 13.5 |
| $As_2O_5$ | .5 |

The above base batch is an ordinary soda-lime-silica plate glass batch and added to this batch during the melting thereof are the following coloring materials:

| | Pounds |
|---|---|
| Commercial titanium dioxide | 120 |
| Commercial cerium hydrate | 40 |

The addition of these coloring materials to the above base batch in the approximate amounts given results in a finished glass having the following composition:

| | Per cent |
|---|---|
| $SiO_2$ | 65.6 |
| $Al_2O_3 + Fe_2O_3$ | .4 |
| $CaO$ | 11.8 |
| $Na_2O$ | 12.2 |
| $As_2O_5$ | .5 |
| $TiO_2$ | 7.5 |
| $CeO_2$ | 2.0 |
| | 100.0 |

It will be noted that in the finished glass, the $TiO_2$ and $CeO_2$ are not in the ratio of 3:1 and this is due to the fact that the commercial cerium hydrate added to the base batch contains only about 75% CeO₂.

The invention is also not limited to these specific percentages of titanium and cerium oxides in the finished glass, as such oxides may be purposely varied within a limited range. For instance, the finished glass may contain approximately 1.5% to 3% CeO₂ and approximately 6% to 9% TiO₂. Also, the base plate glass batch given above may be modified in different ways without changing the effectiveness of the cerium hydrate and titanium dioxide. For instance, the salt cake in the batch may be replaced by borax or part of the salt cake or soda ash may be replaced by sodium nitrate.

The inclusion of the cerium and titanium in the above base glass batch results in a finished glass having an exceptionally attractive and pleasing golden color and it has been definitely ascertained that such a glass has a high degree of effective visible transmission. In order to determine the spectral transmission of the special mirror glass above described, sheets of this glass having a thickness of .250 of an inch were tested by using a Bausch & Lomb large Littrow Quartz Spectograph with a Pointolite or 500 watt tungsten lamp. By such method, it was found that the transmission of the glass of the effective visible portion of the spectrum is very high.

More specifically, it was determined that the transmission of the glass at 5,000 Angstrom units is 75%, at 6,000 Angstrom units 89%, and at 7,000 Angstrom units 91%. The average transmission in the visible range between 5,000 and 7,000 Angstrom units is 83.7%. This figure was determined by the method of thirty selected ordinates for this region and was based on the energy in sunlight above the atmosphere which is equivalent to daylight (illuminant C) in the visible. Therefore, the visible portion of the spectrum is allowed to pass through the glass so that transmission of the visible light is relatively unaffected.

In forming a mirror using the special golden glass herein provided, there is applied to one surface of the glass the usual reflecting surface which comprises a layer of silver applied to the glass by any of the well known methods of silvering. Likewise, any ordinary silvering solution may be used such as, for example, the formulas given in National Bureau of Standards Circular No. 389, issued January 6, 1931. I have discovered that a commercially satisfactory mirror giving a golden reflection can be produced by using the above special glass and applying thereto a conventional silvering solution to form the reflecting surface. The addition of the titanium dioxide and cerium hydrate to a soda-lime-silica base batch of the type referred to above results in a transparent colored glass which, when silvered, will have the appearance of ordinary clear glass which has been golded. The use of the ordinary silvering solutions in no way adversely affects or modifies the golden reflection of the glass nor do they affect the brilliance and clarity thereof. Moreover, the brilliance and clarity of the mirror is greatly enhanced by the high transmission of the glass of the effective visible portion of the spectrum.

I have furthermore discovered that when this special golden glass is silvered it possesses the same appearance in daylight as in artificial light. Since this glass can be silvered with the ordinary silvering solutions, the use of the more expensive golding solutions are eliminated as well as the objectionable features incident to the handling and application thereof. The silvering solution can be applied to the special golden glass herein provided just as easily, quickly and conveniently as it can be applied to clear transparent glass, with the result that the golden mirror of this invention can be produced at a cost comparable with the ordinary silvered mirror. As the color of the mirror is in the glass itself, the color of the mirror will remain stable and will not be dependent upon the color of the reflecting surface material or the application thereof to the glass.

I claim:

1. A mirror comprising a sheet of golden colored transparent glass formed from a soda-lime-silica batch to which is added cerium hydrate and titanium dioxide, and a reflective backing on the glass sheet formed from a silvering solution.

2. A mirror comprising a sheet of golden colored transparent glass formed from a soda-lime-silica batch to which is added titanium dioxide and cerium hydrate in the ratio of approximately 3 to 1, and a reflective backing on the glass sheet formed from a silvering solution.

3. A mirror comprising a sheet of golden colored transparent glass formed from a soda-lime-silica batch to which is added titanium dioxide and cerium hydrate in the ratio of approximately 3 to 1 and the oxides from which constitute approximately 10% by weight in the finished glass, and a reflective backing on the glass sheet formed from a silvering solution.

4. A mirror comprising a sheet of golden colored transparent glass formed from a soda-lime-silica plate glass batch and containing titanium oxide and cerium oxide, and a reflective backing on the glass sheet formed from a silvering solution.

5. A mirror comprising a sheet of golden colored transparent glass formed from a soda-lime-silica plate glass batch and containing approximately 10% by weight of titanium oxide and cerium oxide, and a reflective backing on the glass sheet formed from a silvering solution.

6. A mirror comprising a sheet of golden colored transparent glass formed from a soda-lime-silica plate glass batch and containing approximately 10% by weight of combined cerium oxide and titanium oxide which is added to the batch in the ratio of approximately 3 parts titanium dioxide to 1 part cerium hydrate, and a reflective backing on the glass sheet formed from a silvering solution.

7. A mirror comprising a sheet of golden colored transparent glass formed from a soda-lime-silica plate glass batch and containing approximately 1.5% to 3% CeO₂ and approximately 6% to 9% TiO₂, and a reflective backing on the glass sheet formed from a silvering solution.

WILBUR F. BROWN.